Aug. 22, 1933.   S. C. DESSEL   1,923,921

MOWER

Filed March 28, 1932

Inventor
Sylvan C. Dessel
By H. P. Doolittle
Atty.

Patented Aug. 22, 1933

1,923,921

UNITED STATES PATENT OFFICE 1,923,921

MOWER

Sylvan C. Dessel, Livingston, Calif., assignor to International Harvester Company, a Corporation of New Jersey Application March 28, 1932. Serial No. 601,533

14 Claims. (Cl. 56—276)

The invention relates to mowers and, more particularly, to an improved mechanism for tilting the cutter bar thereof.

As is well understood in this art, the mower cutter bar must be tilted at times in operation of the bar over uneven ground, to prevent the finger guards thereof from digging into the ground, so that the cutting mechanism will not be injured. In this connection, a hand lever has been provided, so that, when the operator approaches unevenness in the ground, he can tilt the bar backwardly by raising the front ends or points of the guard fingers, so that the bar will ride nicely over the unevenness. In some locations where drainage ditches are employed, ridges of ground, known as levees, are formed; and it is found that the known tilting features provided for mowers are not adequate to meet such conditions.

Accordingly, it is the object of this invention to provide an adidtional tilt control mechanism for a mowing machine, so that the cutter bar may easily be caused to ride over raised ground formations which cannot now be adequately taken care of by present known forms of tilting mechanisms.

Figure 1:
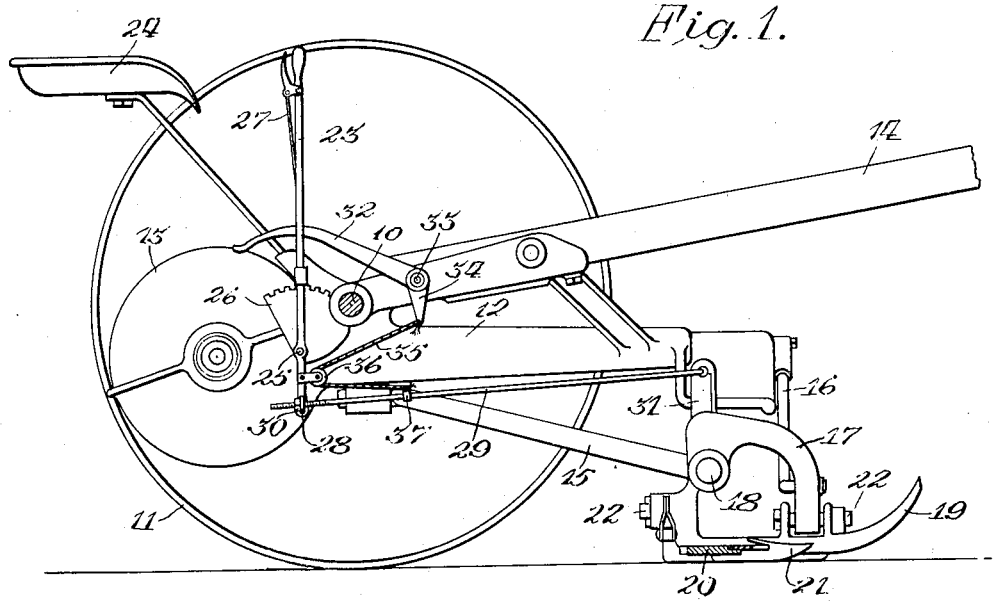
Figure 2:
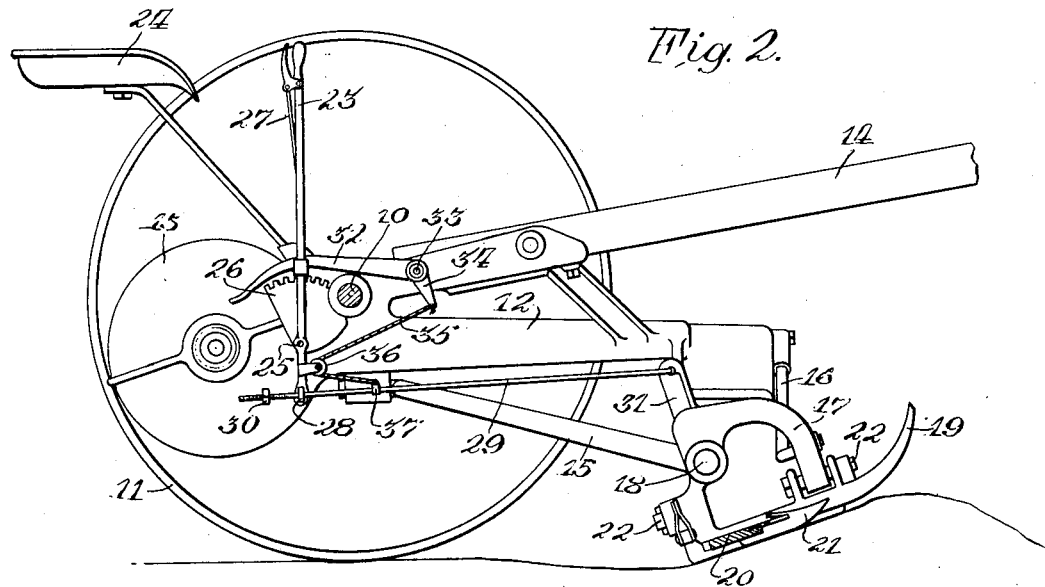

In the accompanying sheet of drawing an illustrative embodiment of my invention has been shown, in which:

Figure 1 is a side view of a standard mower with the cutter bar lying flat on even ground; and, Figure 2 is a similar view showing the cutter bar tilted by the improved tilt mechanism, so that the same may ride over a ground ridge.

The invention is applied to a standard mower having a transverse axle 10 carried in a pair of ground wheels 11 in the usual way. The axle carries a main frame 12 including the gear box 13 with a draft pole 14 connected to the frame. By means of coupling elements 15 and 16, a yoke 17 is pivotally carried on pivot 18 to permit the yoke 17 to pivot up or down about a transverse horizontal axis in a manner well known in this art. Associated with the yoke 17 is the inner shoe 19. The yoke also carries in the usual way the transversely extending cutter bar 20 shown in section, to which the guard fingers 21 are connected in the usual manner. The cutter bar structure 20—21 with the shoe 19 is hingedly connected at 22 to the yoke 17 in the usual manner, so that the cutter bar 20 may be vertically adjusted, the connections for so adjusting the mower bar not being shown, as this is standard in the art and not a part of this invention; the present invention, relating only to the means for tilting the yoke 17 about the axis 18, so that the guard fingers 21 may be raised to cause the same to ride over ground ridges.

The structure for operating the tilting movement of the cutter bar 20 comprises a hand lever 23 accessible from the operator's seat 24, the lever being fulcrumed at 25 at any appropriate place on the main frame 12 adjacent a quadrant 26, so that the lever 23, by means of a conventional detent 27, may be locked in position on the toothed quadrant 26. The lever 23, it will be noted, extends some distance below its fulcrum 25 where it carries an eye 28, through which is slidably passed a fore and aft extending rod 29 having a stop nut 30 threadedly mounted for adjustment at its rear end in back of the eye 28.

The forward end of the rod 29 is connected to a lever 31 rigidly secured to the yoke 17. So much of the tilting structure just described is standard and operates in the usual way; that is, when the lever 23 is moved ahead, the eye 28 engages the stop nut 30 to pull the rod 29 back, thereby tilting the yoke 17 and cutter bar 20 therewith, rearwardly about axis 18 through lever 31. As shown in Figure 2, the sliding relationship of rod 29 to lever 23 also permits the cutter bar 20 to tilt by itself over slight ground unevenness. In other words, this constitutes a lost motion connection, so that the bar tilts slightly, automatically, even when the lever 23 is locked.

In connection with unusual ground ridges, such as the levees heretofore mentioned, it is found that the above conventional tilt mechanism is inadequate, as the guards 21 will not rise automatically a sufficient amount to prevent their digging into the ridge. Accordingly, this invention provides a foot lever 32, appropriately fulcrumed at 33 on the main frame with a lower end 34 extending downwardly beyond the fulcrum 33. The part 34 of the lever has connected to it a flexible connection in the form of a cable 35 that is trained around a pulley wheel 36, which may be carried by the lower end of lever 23, said cable 25 then passing forwardly to be secured to a set-collar 37 anchored in any desired position on the rod 29. Obviously, actuation of the foot lever 32 will cause the cable 35, through the structure described, to pull the rod 29 rearwardly to tilt the yoke 17 and cutter bar 20 when an abrupt rise of the ground makes it necessary to quickly tilt the cutter bar.

It will be seen that the foot lever 32 is conveniently accessible to the operator from his seat 24 and that he can actuate the same at any time upon approaching a levee ridge or the like, without bothering to actuate the lever 23 which may remain locked to maintain the normal set or tilt position of the cutter bar.

The two levers 23 and 32 are selectively operable independently of each other as the operator may desire.

From this detailed description it will be seen that an improved tilt mechanism has been provided for mowers, which achieves the desirable object heretofore recited. It is the intention to cover all such changes and modifications of the example of the invention herein shown as do not depart from the spirit and scope of the invention which is set forth in the following claims.

What is claimed is:

1. In combination, a mower having a main frame, a cutter bar tiltably connected to the main frame, a hand lever on the main frame connected to tilt said bar, and a foot lever connected to tilt the bar, said levers being selectively operable.

2. In combination, a mower having a main frame, a cutter bar tiltably connected to the main frame, a hand lever on the main frame connected to tilt said bar, and a foot lever connected to tilt the bar independently of the hand lever.

3. In combination, a mower having a main frame, a cutter bar tiltably connected to the main frame, a hand lever on the main frame connected to tilt said bar, a foot lever fulcrumed on the frame, and flexible connections between said foot lever and bar to tilt the latter.

4. In combination, a mower having a main frame, a cutter bar tiltably connected to the main frame, a foot lever carried on the frame, and flexible connections between said lever and bar to tilt the latter.

5. In combination, a mower having a main frame, a cutter bar tiltably connected to the main frame, a hand lever carried by the frame, a rod slidably connected with the hand lever to tilt the bar, said slidable connection adapting the bar for automatic tilting movement as the bar rides over uneven ground, and foot lever controlled means for positively tilting the bar, said foot lever having connection with the rod.

6. In combination, a mower having a main frame, a cutter bar tiltably connected to the main frame, a hand lever carried by the frame, a rod slidably connected with the hand lever to tilt the bar, said slidable connection adapting the bar for automatic tilting movement as the bar rides over uneven ground, a foot lever carried on the frame, and flexible connections between the foot lever and rod positively to tilt the bar.

7. In combination, a mower having a main frame, a cutter bar tiltably connected to the main frame, a hand lever carried by the frame, a rod slidably connected with the lever below its fulcrum, said rod connected to tilt the bar, a second lever carried on the frame, and connections between said second lever and rod positively to tilt the bar upon actuation of the second lever.

8. In combination, a mower having a main frame, a cutter bar tiltably connected to the main frame, a hand lever carried by the frame, a rod slidably connected with the lever below its fulcrum, said rod connected to tilt the bar, a foot lever carried on the frame, a set-collar anchored on the rod, a pulley, and a flexible connection from the foot lever passed around the pulley and secured to said set-collar.

9. In combination, a mower having a main frame, a cutter bar tiltably connected to the main frame, and a plurality of selectively operable levers on the frame connected to tilt said bar.

10. In combination, a mower having a main frame, a cutter bar tiltably connected to the main frame, a hand lever on the main frame connected to tilt said bar, and a second lever to tilt the bar independently of the first lever.

11. In combination, a mower having a main frame, a cutter bar tiltably connected to the main frame, a first lever for tilting the bar, a second lever, and flexible connections between the second lever and bar to tilt the bar independently of the first lever.

12. In combination, a mower having a frame, a cutter bar tiltably connected to the frame, means including a lever and detent mechanism for controlling the tilt of said bar, said detent mechanism serving to lock the lever and hold the bar in a predetermined tilted position, and additional means to augment the tilt of the cutter bar.

13. In combination, a mower having a frame, a cutter bar tiltably connected to the frame, means including a hand operated lever and detent mechanism for controlling the tilt of said bar, said detent mechanism serving to lock the lever and hold the bar in a predetermined tilted position, and additional means comprising foot operated mechanism to augment the tilt of the cutter bar.

14. In combination, a mower having a frame, a cutter bar tiltably connected to the frame, means including a lever and detent mechanism for controlling the tilt of said bar, said detent mechanism serving to lock the lever and hold the bar in a predetermined tilted position, and additional means whereby the cutter bar may be tilted further, said lever and detent remaining locked.

SYLVAN C. DESSEL.